UNITED STATES PATENT OFFICE.

JOHN L. KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF SHREDDED-CEREAL BISCUIT.

1,197,297.  Specification of Letters Patent.  Patented Sept. 5, 1916.

No Drawing. Original application filed May 17, 1915, Serial No. 28,586. Divided and this application filed December 31, 1915. Serial No. 69,538.

*To all whom it may concern:*

Be it known that I, JOHN L. KELLOGG, a citizen of the United States, residing in Battle Creek, in the county of Calhoun and State of Michigan, have invented a new and useful Improvement in the Manufacture of Shredded-Cereal Biscuit, of which the following is a specification.

My invention relates to the manufacture of shredded cereal foods from grains, such as wheat, corn, oats, rye and malt, and has for its primary object to provide an improved method of introducing an artificial flavoring into the product, and to make a product having such improved flavoring, which has been thoroughly and completely cooked and aerated, and also having an exceptionally attractive and appetizing form and appearance.

Before my present invention shredded cereal foods such as shredded wheat and shredded wheat biscuit were usually manufactured from the grains without the use of flavoring, the grains being, in one process, boiled for about thirty (30) minutes or until partly cooked, allowed to temper for a few hours and then shredded. It was usually found impossible to cook any saccharine flavoring or salt into wheat, for example, without impairing the shredding qualities of the grain. Wheat, especially, has an outside coating of bran which is impossible to penetrate with a syrup, the syrup sticking to the outside of the berry. When the berry was shredded, it was found that the particles of wheat would not stick together and form a shred on account of the syrup producing an action which would not allow the carbo-hydrates of the grains to unite. I, therefore, conceived the idea of pulverizing the grain, such as wheat, corn, oats, rye or malt, into a fine flour, mixing therewith the flavoring material, such as sugar, malt extract, salt and water in sufficient quantities to give the flavor desired; mixing the whole into a stiff dough; and forming the same, by preference, into small individual slabs. These slabs were then cooked and dried and broken up into small particles. These particles were then in the preferred process air dried and placed in the shredding mills and reduced to shreds of, by preference, elongated, ribbon-like form. These elongated ribbon-like shreds from the shredding mills were cut up and pressed into biscuit form and baked in special ovens to form light biscuits consisting of the crisp, curly and wavy ribbon-like shreds interlaced and united.

In order that my invention may be fully understood, I shall first describe in detail the mode in which I carry the same into practice.

In the preparation of the ribbon shred cereal biscuit, I prefer first to pulverize the grain, which may be whole wheat, corn, oats, rye, malt or other suitable cereal, into a fine flour, preferably on a French bur stone so as to crush but not cut and destroy the texture. To, for example, six hundred pounds of such whole wheat unbolted flour, I add, by preference, two hundred and fifty pounds of water in which I have previously thoroughly dissolved six per cent. of sugar and two per cent. of salt. I then mix the flour in this solution with a rotary mixer very thoroughly for a period of about ten minutes until the mass is a thick, heavy dough. I then by preference break the dough through an ordinary dough breaker, and roll or mold it, preferably, into small individual slabs. In actual practice, I make these slabs about 12" wide, 24" long and 2" or 3" thick. These slabs are then cooked preferably by laying them in ordinary steel trays one on top of the other and placing the trays in an ordinary canner's steam retort and cooking them for about an hour and a half at about fifteen pounds steam pressure, which gives a temperature of about 250° F. After cooking, the slabs are by preference piled up in wire racks and allowed to dry in the atmosphere until quite dry. It generally takes from twenty-four to forty hours to accomplish this drying. These cooked and dried slabs are then, by preference, broken up by ordinary swing hammer mills into rough cubes about one inch square, and then by a breaker or a grinder into small particles about the size of a pea or grain of wheat. These particles are then, by preference, passed through a Hess drier or similar drier and a current of dry air delivered through the same until the material is deprived of all surplus moisture and reduced to the proper consistency for shredding. The dried particles are then placed, by preference, in shredding mills of the ordinary kind and shredded so as to form shreds of elongated ribbon-like form. The elongated ribbon-like shreds, formed as above described by the shredding mills, are, by preference, gathered upon an endless belt from ten or more shreds, cut and pressed into biscuits and baked in suitable ovens for about thirty minutes at a temperature of from 450° to 500° F. A current of dried air is then, by preference, caused to circulate over and through the biscuits thus formed, thoroughly to dry the same, forming the final product, ready for the market. These biscuits owing to the attractive curly and wavy ribbon-like form of their loosely interlaced and united constituent shreds, present an exceptionally appetizing appearance to the eye and possess also the easy digestibility and a peculiarly palatable flavor imparted by this process of manufacture.

I claim as my invention:

1. A process of preparing a shredded cereal food biscuit, during the performance of which the cereal grain is pulverized and mixed with water to form a dough, the dough cooked, dried and broken into small particles, the particles shredded into elongated flat ribbons, the flat ribbons cut up into shorter pieces, the pieces pressed together into biscuit form, and the biscuits baked or toasted.

2. A process of preparing a shredded cereal biscuit during the performance of which small pieces of a cooked and dried cereal material are shredded into elongated flat ribbons, the elongated ribbons cut up into shorter pieces, the pieces pressed into biscuits, and the biscuits baked or toasted.

3. A shredded cereal food biscuit consisting of dried elongated flat ribbons cut up into shorter pieces and the pieces pressed together and baked or toasted.

JOHN L. KELLOGG.